May 10, 1932.  F. C. RICHARDSON  1,857,821
FLEXIBLE HOSE AND CONNECTION
Filed March 7, 1930
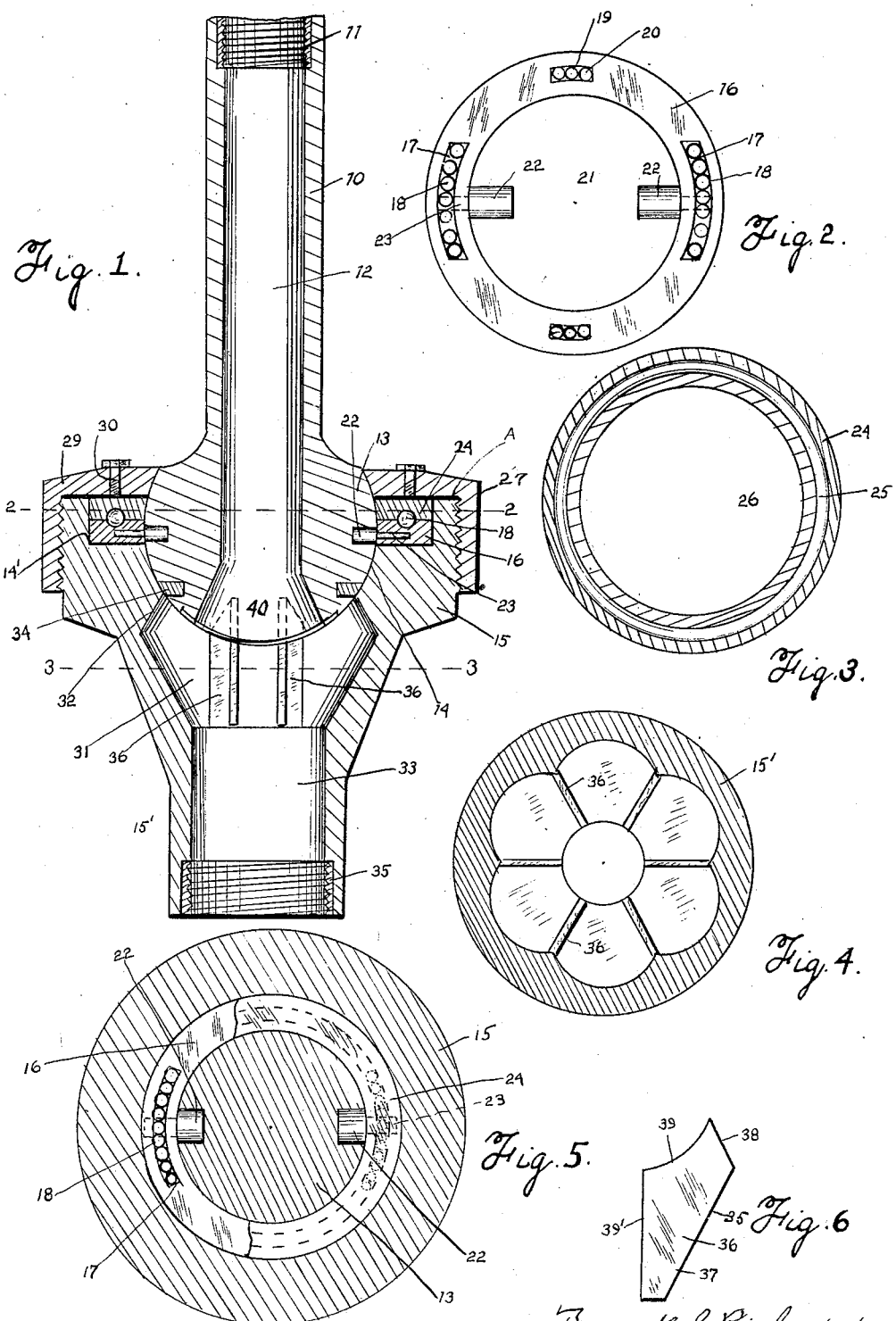

Patented May 10, 1932

1,857,821

UNITED STATES PATENT OFFICE

FRANK C. RICHARDSON, OF LOS ANGELES, CALIFORNIA

FLEXIBLE HOSE AND CONNECTION

Application filed March 7, 1930. Serial No. 433,969.

This invention relates to improvements in flexible hose and hose couplings and the like.

One of the objects of the present invention is to provide a simple, efficient and inexpensive flexible hose designed along lines of approved angular adjustment of one hose section with relation to another hose section, and operating to provide a fluid tight connection between the associated sections in whatever angular or universal position they may be placed.

A further object of this invention is to provide a flexible hose wherein use is made of a joint section of tubular formation and of a tubular fitting having a universal movement in the joint section and maintaining a fluid-tight connection with it in any angular position it may be placed in.

Another object of this invention is to provide, in a flexible hose, an arrangement of parts whereby the hollow ball end of the tubular fitting is designed to rotate in one plane and to have a swivelling motion in a plane at right angles to its rotating plane, the hollow ball registering and communicating, at all times, with the internal bore of the joint section.

A still further object of this invention is to provide a tubular fitting with a hollow integral ball designed to snugly fit in a corresponding socket formed in a joint tubular section, the arrangement being such that a rotatable annular body is carried by the ball of the fitting which can revolve freely in the joint section, while pintles are carried by the rotatable body upon which the fitting can swivel in a plane at right angles to the rotating plane of the fitting.

Another object of this invention is to provide a frictionless bearing for the moving parts of the hose coupling whereby the ball end of the fitting may rotate as well as swivel with a minimum of resistance and wear, means being also provided for compensating the pressure exerted by the anti-friction bearings upon the moving parts when wear shall occur.

Another object of this invention is to provide a flexible hose composed of a joint section and a tubular fitting therefor characterized by the feature of simplicity and ease of operation, and efficient distribution of the fluid in the internal passage of the hose no matter in what adjusted position the fitting may be placed. In this connection there is provided internally of the bore or passage of the joint section a plurality of radially disposed baffle plates designed to concentrate the fluid, mud or other material passing thru the fitting and joint section, or vice versa, and causing the same to be delivered conveniently out of the joint section or fitting.

With the above and other objects in view my invention consists in the combination, arrangement and details of construction disclosed in the drawings and specification, and then more particularly pointed out in the appended claims.

In the drawings, wherein similar reference characters designate similar parts throughout the respective views, Figure 1 is a vertical sectional elevation of my invention, Figure 2 is a top plan view of an annular rotatable body to be described, Figure 3 is a cross sectional view taken on line 2—2 of Fig. 1, Figure 4 is a cross sectional view taken on line 3—3 of Fig. 1, Figure 5 is a sectional view taken thru the joint section, and Figure 6 is a detail view of a baffle member.

In the drawings, which are merely illustrative of my invention 10 designates a tubular fitting having at one end a threaded coupling collar 11 imbedded or otherwise secured therein, this tubular fitting having an internal bore and formed at one end with a ball of hollow interior designated 13, the bore of which flares downwardly as at 40 to communicate, in any adjusted position, with the bore of a joint tubular section designated broadly as 15' and carrying therein a threaded coupling collar designated 35. The tubular joint section 15' is formed at one open end with an enlargement 15 which is provided with a counterbore or counterseat of annular shape 14' and which counterbore is intersected by a ball socket 14.

The hollow ball 13 of the tubular fitting is snugly and movably received in the corresponding socket 14 made therefor in the joint tubular section 15'. The joint section itself has its main bore or passage 33 widened at a point intermediate the ends of the section at which area of the joint section the passage 33 converges towards the socket 14, so as to register therewith, the diameter of the passage 33 being increased here, and the passage 33 then converges in an opposite direction as at 31 until it merges with the main passage 33. In any adjusted or angular position of the hollow ball 13 it is assured that fluid or other material passing from the tubular fitting into the tubular joint section will pass without obstruction in its path of movement thru both of these bodies.

As a means of allowing a rotative movement for the tubular fitting 10 in the joint section in a plane at right angles to the axis of the joint section there is provided two annular bodies, 16 and 24 respectively each being of the same shape and diameter exteriorly. The annular body 16 is ring-shaped having the central opening 21 into which the hollow ball 13 of the fitting projects above its center line; this annular body 16 is also provided at diametrically opposite points with arcuate grooves 17 in which are located a series of anti-friction balls 18 confined snugly in said grooves. The other annular body 24 has a central opening 26 in which the hollow ball 13 extends above its center line, and this body is formed with an internal annular groove 25. The annular body 16 has its bottom seated rotatedly in the counter seat 14' of the joint section, with the anti-friction balls 18 projecting thereabove, and the annular body 24 has its grooved channel portion 25 inverted with respect to the arcuate grooves 17 of the body 16, so the balls 18 will project into the groove 25, so when this body 24 is fixed in position and the body 16 rotates the anti-friction balls 18 will move with body 16, the end walls of the grooves 17 permitting this body 16 to roll upon the body 24 as it is rotated.

As a means of causing the tubular fitting 10 to move in unison with the annular body 16 I provide a pair of pintles 23 projecting partially into the inner edge of the annular body 16 and projecting partially into the hollow ball 13 of the fitting 10, at diametrically opposite points of this ball above its medial line as shown in Figure 1 where the enlarged portions 22 of the pintles removably enter the ball. In this manner when the tubular fitting 10 is rotated the pintles 23 will cause the annular body 16 to rotate freely in the counterseat 14' of the joint section, so the ball imparts rotative motion to the annular body 16.

As a means of holding the annular body 24 against movement with the body 16 I provide a cap 27 which is internally threaded and which is designed to be screwed home upon the externally threaded portion of the enlargement of the joint section 15'. There is a washer A interposed between the top of cap 27 and the top of the annular body 24 so this washer is compressed against the body 24 when the cap is screwed home. It will be seen that the cap has its inner edge adapted to the curvature of the adjacent surface of the hollow ball 13 of fitting 10 so as to snugly embrace this portion of the ball. Set screws 30 are tapped thru the top of the cap 27 by means of which pressure is exerted upon the top and fixed annular body 24, so this body cannot rotate with the body 16 engaged thereunder. When wear takes place in either or both annular bodies 16 and 24 this can be compensated by adjusting the set screws 30 to make them extend down deeper into the counterseat to contact both bodies together. In order to provide a fluid tight seal between ball and socket an annular packing ring 34 is provided which is countersunk into the ball 13 preferably at a point below its central line, which packing rubs against the adjacent surface of the joint section 15, in a plane with the converging area 32 of the bore 33 of this section 15'. As the ball is mounted by pintles heads 22 upon this joint section it will be seen that the ball is free to swivel upon these pintles in a plane at right angles to the axis of rotation of the body 16. Therefore the ball 13 undergoes a universal movement in its socket.

In order to assure proper passage of solid substances such as mud from tubular fitting to joint section or vice versa without clogging any passages in either part I provide a plurality of radially arranged baffle plates 36 for use in the area 32 of the bore 33.

Each baffle plate, as shown in Figure 6 is composed of a plate having one side 35 inclined with respect to a perpendicular side or edge, with an upper diagonal edge 38 thereof joining an arcuate edge 39 which also joins the perpendicular edge 39', the edge 39' being perpendicular in the position of the plate as shown in Figure 6. The plurality of radially disposed plates 36 are arranged to extend in the area 32 of the passage 33, where it is widened, in a manner to cause the arcuate edges 39 thereof to fit the under surface of the ball 13 of fitting 10, the inclined edges 37 coinciding with the converging surface of the area 31 of this passage, while the diagonal top edges 38 coinciding with the surfaces of the internal wall of the area 32 of this passage. They are secured by any desirable means in this passage, and when they are all assembled it will be seen that the fluid or mud coming from the tubular fitting 10 and leaving bore 40 of the hollow ball, in any angular position the ball occupies relatively to bore 33 of section 15', will be guided and directed thru any of the compartments between the baffle plates 36 to find its way out of the bore 33 of the joint section 15'. In this manner the mud or other heavy moving materials will only enter thru certain compartments the others being free to prevent clogging up passage 33 suddenly.

From the foregoing it will be readily seen that I have disclosed an arrangement of parts effective to permit passage or transmission of fluids from a tubular fitting into a joint section also tubular and arranged at a universal tilted position relatively to the fitting or vice versa. I do not mean to confine myself to the exact details of construction herein set forth but cover all variations falling within the purview of the appended claims.

What I desire to claim and secure by Letters Patent is:—

1. In combination a tubular joint section having an internal bore formed at one open end with an annular counterseat and with a ball socket intersecting said counterseat, said socket communicating with the bore of the joint section, a tubular fitting having a hollow ball removably seated in said socket and having a flaring bore passage communicating with the bore of the joint section, an annular body rotatedly mounted in the counterseat and engaging the lateral surface of the ball, a fixed annular body in said counterseat, anti-friction balls interposed between both annular bodies, a pair of diametrically opposite pintles carried by the rotatable annular body and projecting into the ball of the fitting to allow the latter to move with the rotatable body and to swivel thereupon, and means removably carried by said tubular joint section and confining the ball of the fitting and the annular bodies against displacement from the joint section.

2. In a device as described, in combination, a tubular joint section formed with an axial bore and at one open end with an enlarged portion having an annular counterbore and formed with a ball socket communicating with said bore, a tubular fitting having a hollow ball received snugly and movable in said socket, the bore of the section flaring towards the socket to widen the bore so the bore of the tubular fitting may register therewith in varying angular positions, a pair of complemental annular bodies arranged in said counterseat, a pair of pintles arranged at diametrically opposite points below the medial line of the ball and projecting partly into the lower of said annular bodies as well as into the ball, to allow the ball to swivel upon the lower body, the lower annular body having diametrically arranged arcuate grooves formed at its outer face, a series of anti-friction balls in said arcuate grooves, the other annular body having an annular groove into which said balls project, a cap threaded to the joint section and having an inner edge embracing the ball, a washer between the cap and the adjacent body, and set screws tapped adjustably thru the cap to engage the adjacent body to contact both bodies against the anti-friction balls.

3. In a device as described, in combination a joint section consisting of a tubular portion and an enlarged portion formed upon the tubular portion, said enlarged portion having an internal socket opening out of the joint section and having an intermediate passage converging to register with said socket and converging also towards the tubular portion in an opposite direction, a tubular fitting having a universal movement in said socket and having a passage registering with the adjacent converging area of the passage, and a series of radially disposed baffle plates arranged in said passage and having edges curved to engage the adjacent movable surface of the tubular fitting.

4. In combination a joint section formed with an internal bore and with an open ended ball socket, the intermediate area of the bore flaring towards and registering operatively with the socket, a tubular fitting having a hollow ball having a universal bearing in said socket with a passage registering in adjustable positions with the flaring area of the bore of the joint section, packing providing a fluid tight seal between the ball and the walls of said passage, and a series of radially disposed baffle plates in said passage receiving fluid in any angular position of the ball and directing same out of section.

In witness whereof he has hereunder set his hand this 19th day of February, 1930.

FRANK C. RICHARDSON.